3,309,267
CONTROLLING BULLHEADS WITH 3-NITRO-
HALOSALICYLANILIDES
Roland J. Starkey, Jr., Cleveland Heights, Ohio, assignor to Ben Venue Laboratories, Inc., Pittsburgh, Pa., a corporation of Pennsylvania
No Drawing. Filed July 6, 1965, Ser. No. 469,853
8 Claims. (Cl. 167—30)

This invention relates to new and improved methods and means for controlling fish and more particularly for controlling bullheads and the like.

The control and/or eradication of fish species which are troublesome, either because they are parasites, bottom feeders, which upset the biological balance in ponds, lakes or streams, or because they are unwanted fish, which easily breed and multiply and use up available food supplies, and thus destroy, drive out, supplant or otherwise adversely effect game, sport and otherwise economically desirable fish from the ponds, lakes and streams, which are their normal habitat, is desirable.

Recently it has been suggested to control unwanted fish through the use of chemicals which are themselves specifically toxic only to the unwanted fish or which may be handled or used in such a way so as to at least reduce the lethal effects on the economically desirable fish, while eradicating the unwanted fish.

The problems are much greater, however, than appear from this broad general statement because the chemicals must be reliable, must function under adverse circumstances and in a wide range of specific environmental situations, and must not result in permanent pollution or contamination of the water treated, including particularly contamination which reaches and deteriously effects mankind, especially in and from drinking water systems and the like.

One of the more noxious and least wanted of fish, at least in certain parts of the country, are those of the family Ictaluridae, more commonly known as catfish and/or bullheads. These fish are bottom feeders and scavengers which compete for and/or interfere with the biological food chain of sport, game and other economically desirable fish and/or prey and feed upon the adult desirable fish and their fry. Further the catfish and bullheads are prolific and hardy with the result that their infestation of and multiplication in a given body of water competes with and seriously depletes and/or stunts the growth of the wanted fish to such an extent that successful games fishing is seriously effected both because of the reduction in numbers of the game fish and the stunting of their growth below legal minimums, which, as is well known, are common in the states. And, of course, it is desirable to control the unwanted fish by means which are selective with respect to wanted fish—if possible and to the greatest extent possible vis-a-vis the other considerations for effective control, especially by chemicals per se, set forth above.

Rotenone and rotenoids, the principal insecticidal constituent of the Derris root have been tried and used, in various formulations, for control of bullheads and other fish but these chemicals are generally vivicidal to all animal life, including humans, and are not selective between wanted and unwanted fish. Thus, treatment of waters with rotenone and rotenoids in sufficient concentrations to be toxic to the unwanted fish also kills the wanted fish and contaminates the waters and run off waters relative to other life.

Other fish toxicants and methods of controlling bullheads and the like have proven equally ineffective or undersirable.

Accordingly, it is a general object of this invention to provide new and improved method and means for controlling bullheads (the family Ictaluridae, including *Ictalurus nebulosus* [brown bullhead], *Ictalurus melas* [black bullhead], and *Ictaturus natalis* [yellow bullhead]) and the like.

Further general objects of this invention include the provision of new and improved method and means for controlling bullheads and the like which has a high degree of specificity for bullheads and/or other undesirable or unwanted species; which has no or low toxicity for game, sport and otherwise desirable or wanted fish; which is selective in its effect as between bullheads and the like and game or sport fish; which is relatively more active than other toxicants in cold water because of the bottom feeding habits of the bullheads; which has a high degree of toxicity and specific toxicity in cold water in order to be effective against bottom feeding bullheads and the like in their natural habitat; which is readily adaptable to a plurality of formulations to facilitate ease of application in shallow and deep water; which is safe for handling by distribution crews in the field and habitat areas; and, which can be used prophylactically annually or biannually to control (or suppress) the bullheads without requiring suspension of normal sport fishing, and the like, to await detoxification.

A still further object of this invention is to provide new and improve method and means for controlling bullheads and the like obtaining one or more of the objects and advantages hereinbefore set forth.

These and other objects and advantages of this invention will appear from the following description of preferred forms thereof.

The method and means of this invention is, as noted above, particularly adopted for controlling bullhead (the family Ictaluridae, including *Ictalurus nebulous* [brown bullhead], *Ictalurus melas* [black bullhead], and *Ictaturus natalis* [yellow bullhead] and the like, which are bottom feeders and frequently unwanted in inland ponds, lakes, streams and habitats where game and sport fishing is practiced and encouraged, with, however, a high degree of selectivity against the bullheads and the like vis-a-vis trout and other wanted game and sport fish.

Broadly the method and means of this invention comprises treating the habitat, pond, lake, stream or other body water, containing the unwanted bullheads, whether they be mature or immature, with a lethal to bullheads amount of 3-nitrohalosalicylanilide having the general formula

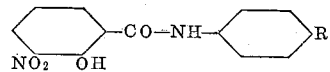

where R is a halogen.

More particularly the method and means of this invention comprises treating the habitat of the unwanted, mature and/or immature bullheads, with an amount of 4'-iodo-3-nitrosalicylanilide which, as will hereinafter more full appear, has unexpected and unobvious specificity against bullheads vis-a-vis trout and other desirable or wanted game or sport fish and is unexpectedly substantially as effective and as selective in cool waters as in warm waters, thereby permitting effective use thereof in low concentrations which are otherwise not substantially deleterious to other life in the lower strata of water where the bullheads feed and live.

Thus this invention provides method and means for controlling bullheads which exhibits a high degree of specificity for bullheads in extremely low concentrations, e.g., 50–60 parts per billion, and over a wide range of water temperatures (47°–72° F.).

EXAMPLE I

Waters containing trout, snails, and brown bullheads were treated with 4'-iodi-3-nitrosalicylanilide to determine one hundred percent lethal amounts with results as follows:

| Organism | $LD_{100}$ | $LD_{25}$ |
|---|---|---|
| Rainbow Trout (*Salmo gairdnerii*) | 2.0–3.0 p.p.m.[1] | 0.9–1.0 p.p.m.[1] |
| Snail (*Australorbus glabatus*) | 1.0 p.p.m.[1] | |
| Brown Bullhead (*Ictalurus nebulosus*) | 50–60 p.p.b.[2] | |

[1] Parts per million.
[2] Parts per billion.

As shown in Example I, 4′-iodo-3-nitrosalicylanilide is a selectively toxic piscicidal agent and rainbow trout (*Salmo gairdnerii*) are approximately 40 times less sensitive to 4′-iodo-3-nitrosalicylanilide than the brown bullhead (*Ictalurus nebulosus*).

The toxic effect of various 3′-nitrohalosalicylanilide or brown bullheads is a function of both concentration and time.

This is shown in the table below, Example II, wherein water containing brown bullheads was treated with different percentages of 4′-halo-3-nitrosalicylanilides with the following results.

EXAMPLE II

| Compound | Concentration | Time to Death (Hrs./Mins.) |
|---|---|---|
| 4′-iodo-3-nitrosalicylanilide | 1.0 p.p.m | 40 minutes. |
| 4′-bromo-3-nitrosalicylanilide | 1.0 p.p.m | 45 minutes. |
| 4′-chloro-3-nitrosalicylanilide | 1.0 p.p.m | 50 minutes. |
| 4′-fluoro-3-nitrosalicylanilide | 1.0 p.p.m | 120 minutes. |
| 4′-iodo-3-nitrosalicylanilide | 0.1 p.p.m | 6 hours. |
| 4′-bromo-3-nitrosalicylanilide | 0.1 p.p.m | Do. |
| 4′-chloro-3-nitrosalicylanilide | 0.1 p.p.m | Do. |
| 4′-fluoro-3-nitrosalicylanilide | 0.1 p.p.m | 6 days. |
| 4′-iodo-3-nitrosalicylanilide | 0.05 p.p.m. (50 p.p.b.) | 1 day. |
| 4′-bromo-3-nitrosalicylanilide | 0.05 p.p.m. (50 p.p.b.) | 9 hours. |
| 4′-chloro-3-nitrosalicylanilide | 0.05 p.p.m. (50 p.p.b.) | 9–24 hours. |
| 4′-iodo-3-nitrosalicylanilide | 0.025 p.p.m. (25 p.p.b.) | Not effective in 53 hours. |
| 4′-bromo-3-nitrosalicylanilide | 0.025 p.p.m. (25 p.p.b.) | Do. |
| 4′-chloro-3-nitrosalicylanilide | 0.025 p.p.m. (25 p.p.b.) | Do. |

This example demonstrates that the toxicity and specificity are structurally dependent and onset of death at the highest concetration tested (1.0 p.p.m.) is extremely rapid.

Example II also establishes that the activity, as against bullheads of 4′-iodo-3-nitrosalicylanilide, 4′-bromo-3-nitrosalicylanilide, and 4′-chloro-3-nitrosalicylanilide is equivalent in concentrations of 0.05–1.0 parts per million. In contrast, the para substituted fluoro derivative, at each level tested, is relatively inactive.

EXAMPLE III

Unexpectedly 4′-iodo-3-nitrosalicylanilide exhibits activity against bullheads over a wide range of temperatures from as low as 47° F. (8° C.), but this is not so with respect to the corresponding bromo and chloro substituted 3-nitrohalosalicylanilides.

In the following table activity levels of 4′-iodo-3-nitrosalicylanilide are compared at 70° F. (21° C.) and 47° F. (8° C.) with three inch brown bullheads:

*Water pH 7.5, 70° F. (21° C.)*

| Hours exposure: | $TL_m$[1], p.p.b. |
|---|---|
| 12 | 90 |
| 18 | 65 |
| 24 | 61 |
| 24 | 85 |
| 36 | 64 |
| 48 | 56 |

[1] Median Tolerance Limit, $LD_{50}$.

*$LD_{100}$ at 47° F. (8° C.) for 4′-iodo-3-nitrosalicylanilide*

| Parts per billion | hours to $LD_{100}$ |
|---|---|
| 100 | 18 |
| 75 | 48 |
| 50 | days 7 |

Thus equivalent concentrations of 4′-iodo-3-nitrosalicylanilide will kill brown bullheads at 70° F. (21° C.) and 47° F. (8° C.) but will require twice as long to complete eradication at the lower temperature. Piscicidal activity of 4′-iodo-3-nitrosalicylanilide at 47° F. (8° C.) was completely unexpected and is not possessed by other members of the series. Further, since 4′-iodo-3-nitrosalicylanilide is effective at 47° F., it can be utilized for treating pond and lake bottoms which is the natural feeding habitat of the Ictaluridae.

Since it is desrible to treat lakes, ponds, streams, and the like, for bullheads at or near the bottom, as explained above, especially when, as with 4′-iodo-3-nitrosalicylanilide, the treatment toxicant is both effective and selective at the low temperatures there obtaining, this invention has the advantage that the treatment agent can be formulated for addition directly to the bottom of the pond, lake, stream, or the like, without dilution by the higher water strata and without adverse effect on the activity or selectivity of the 4′-iodo-3-nitrosalicylanilide.

Thus the 4′-iodo-3-nitrosalicylanilide may be introduced into water while dissolved in a solvent miscible or emulsifiable with water, e.g., 4′-iodo-3-nitrosalicylanilide dissolved in N,N-dimethylformamide, acetone, dimethylsulfoxide, or N-methyl-2-pyrrolidone.

For example, an appropriate concentrate of 4′-iodo-3-nitrosalicylanilide can be prepared by dissolving 4.0 grams in N,N-dimethylformamide and adjusting the volume to 10 ml. Such a solution contains 400 mg. of the active ingredient/ml. and would be adequate for treating 80,000 liters (21,134 gallons) of water at 70° F. (21° C.). A concentrate of this type would be diluted and mixed with an inexpensive water miscible solvent before use to prevent precipitation of the active agent from water. Application would be achieved by pumping diluted 4′-iodo-3-nitrosalicylanilide into surface waters as in the case of homothermous lakes and ponds. Deeper ponds and lakes containing thermally stratified water would be treated by pumping the active ingredient through weighted hoses suspended from boats.

Alternatively, the 4′-iodo-3-nitrosalicylanilide may be added as pellets with an inert vehicle. This facilitates treatment of pond and lake bottoms by dropping the pellets therein, as from an airplane, and eliminates the problem of diluting concentrates in the field.

These pellets can be made by gradually adding water to a known quantity of colloidal aluminum magnesium silicate flakes (Veegum-Vanderbilt) with mixing. To aid rapid wetting, 0.1% of polyoxyethylene sorbitan monooleate (tween 80– Atlas) is added to the slurry. Mixing is continued and a known quantity of 4′-iodo-3-nitrosalicylanilide (#80 mesh) added until a homogeneous dispersion of the active agent is achieved. The semi-paste can be pelletized by conventional techniques at this stage of manufacture or processed as a bulk product. In either case, the pellets or bulk material are heated at 80–90° C. until dry. The bulk form can be broken into smaller fragments and ground through a coarse screen to provide relatively uniform granules.

The resultant product is non-hygroscopic, relatively dustless, and easily metered into water from hoppers attached to the side of a boat. The pellets and granules do not float in the water but sink to the bottom. Disintegration occurs gradually with most of the break-up taking place on the bottom. Water movement mediated through currents and swimming activities tend to further disperse the active agent entrapped in the colloidal aluminum magnesium silicate matrix.

By way of further example, an emulsion containing 4'-iodo-3-nitrosalicylanilide and providing rapid distribution of the 4'-iodo-3-nitrosalicylanilide between the surface and thermocline in ponds, lakes, and the like, has been prepared. The emulsion can be applied to surface waters and/or, by pumping through weighted hoses, to various depths.

The emulsion is prepared by adding water containing 0.1% polyoxyethylene sorbitan monooleate slowly to a known quantity of aluminum monostearate until a paste has formed. This is thinned by the addition of water and mixed with a known quantity of 4'-iodo-3-nitrosalicylanilide. The slurry is gradually added to a known quantity of colloidal aluminum magnesium silicate with mixing. The emulsion can be thinned with water to adjust the concentration of the active ingredient from 50–100 parts per billion. In this way the emulsion could be provided commercially as a concentrate and could be fed directly from a metering device into water pumped from the lake.

Modifications, changes and improvements to the preferred forms and embodiments of the invention herein depicted and described may occur to those skilled in the art who come to understand the precepts and principles thereof. Accordingly, the patent to be issued hereon should not be limited in its scope to the specific embodiments of the invention herein depicted and described, but by the advance by which the invention has promoted the art.

I claim:

1. The method of controlling bullheads comprising contacting the bullheads with a lethal, to bullheads, amount of a 3-nitrohalosalicylanilide having the formula 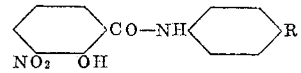 wherein R is a halogen.

2. The method according to claim 1 in which the amount of 3-nitrohalosalicylanilide chosen has a substantial selectivity against said bullheads relative to game and sport fish.

3. The method of controlling bullheads by contacting the bullheads with a lethal, to bullheads, amount of 4'-iodo-3-nitrosalicylanilide.

4. The method according to claim 3, wherein said 4'-iodo-3-nitrosalicylanilide is brought into contact with bullheads in a water solution having a concentration of from about 30 to 100 parts of 4'-iodo-3-nitrosalicylanilide per billion parts of water.

5. The method according to claim 3, wherein said bullheads are in a body of water having strata and said 4'-iodo-3-nitrosalicylanilide is brought into contact with said bullheads in the lower strata of said water.

6. The method according to claim 5, wherein said 4'-iodo-3-nitrosalicylanilide is formed into pellets and sunk to the bottom of said body of water containing bullheads, for contact with said bullheads, without floating or substantial disintegration.

7. The method according to claim 5, wherein said 4'-iodo-3-nitrosalicylanilide is dissolved in a solvent miscible or emulsifiable in water.

8. The method according to claim 7 wherein said solvent is chosen from the group consisting of N,N-dimethylformamide, acetone, dimethylsulfoxide, and N-methyl-2-pyrrolidone.

References Cited by the Examiner

UNITED STATES PATENTS

| | | | |
|---|---|---|---|
| 3,079,297 | 2/1963 | Schravfstatter et al. | 167—31 |
| 3,113,067 | 12/1963 | Strufe et al. | 167—30 |
| 3,238,098 | 3/1966 | Howell et al. | 167—46 |

ELBERT L. ROBERTS, *Primary Examiner.*

SHEP K. ROSE, *Assistant Examiner.*